United States Patent
Foege

(10) Patent No.: US 9,841,146 B2
(45) Date of Patent: Dec. 12, 2017

(54) GAS PRODUCTION SYSTEM FOR PRODUCING HIGH PRESSURE GAS

(71) Applicant: Electro-Motive Diesel, Inc., La Grange, IL (US)

(72) Inventor: AAron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 755 days.

(21) Appl. No.: 14/152,187

(22) Filed: Jan. 10, 2014

(65) Prior Publication Data
US 2015/0198286 A1    Jul. 16, 2015

(51) Int. Cl.
*F17C 9/02*  (2006.01)

(52) U.S. Cl.
CPC .......... *F17C 9/02* (2013.01); *F17C 2221/033* (2013.01); *F17C 2227/0302* (2013.01); *Y02T 10/16* (2013.01); *Y02T 10/32* (2013.01); *Y02T 10/36* (2013.01)

(58) Field of Classification Search
CPC .......... F02G 1/02; F02G 1/44; F02G 2242/40; F02G 2242/42; F02G 2242/44; F02G 1/044; F17C 7/04; F17C 9/02; F17C 9/04; F17C 2221/033; F17C 2227/0302; F01K 23/06; F01K 23/065; F01K 23/08; F01K 23/10; Y02T 10/16; Y02T 10/32; Y02T 10/36
See application file for complete search history.

(56) References Cited

U.S. PATENT DOCUMENTS

| | | | | |
|---|---|---|---|---|
| 4,004,421 A | * | 1/1977 | Cowans | F02G 1/02 123/1 R |
| 4,794,752 A | * | 1/1989 | Redderson | F02G 1/044 60/517 |
| 2005/0268607 A1 | * | 12/2005 | Kleinwachter | F02G 1/04 60/530 |
| 2005/0274127 A1 | | 12/2005 | Drube et al. | |
| 2009/0013686 A1 | * | 1/2009 | Yaguchi | F02G 1/043 60/597 |

(Continued)

FOREIGN PATENT DOCUMENTS

| | | | |
|---|---|---|---|
| JP | 2006-200431 | * | 3/2006 |
| WO | WO 2007/050148 | | 5/2007 |
| WO | WO2013/008446 | * | 1/2013 |

OTHER PUBLICATIONS

Machine translation of JP-2006-200431, retrieved Oct. 25, 2016.*

*Primary Examiner* — Len Tran
*Assistant Examiner* — Hans Weiland
(74) *Attorney, Agent, or Firm* — Finnegan, Henderson, Farabow, Garrett & Dunner, LLP

(57) ABSTRACT

A gas production system for producing high pressure gas is disclosed. The gas production system may perform a method for producing high pressure gaseous fuel. The method may include receiving liquefied fuel in a container having an effective volume, reducing the effective volume of the container, and heating the liquefied fuel. The method may also include releasing some gaseous fuel out of the container. The method may further include increasing the effective volume of the container, cooling residual gaseous fuel, and directing liquefied fuel into the container to replace released gaseous fuel. The method may include converting a change in the effective volume of the container to mechanical power.

8 Claims, 3 Drawing Sheets

(56) References Cited

U.S. PATENT DOCUMENTS

| | | |
|---|---|---|
| 2010/1000551 | 1/2010 | Watts et al. |
| 2010/0275591 A1* | 11/2010 | Hammerman .......... F02G 1/043 60/516 |
| 2011/0100738 A1* | 5/2011 | Russo ...................... B60K 6/24 180/65.245 |
| 2012/0210988 A1* | 8/2012 | Willi ..................... F02D 19/024 123/575 |

* cited by examiner

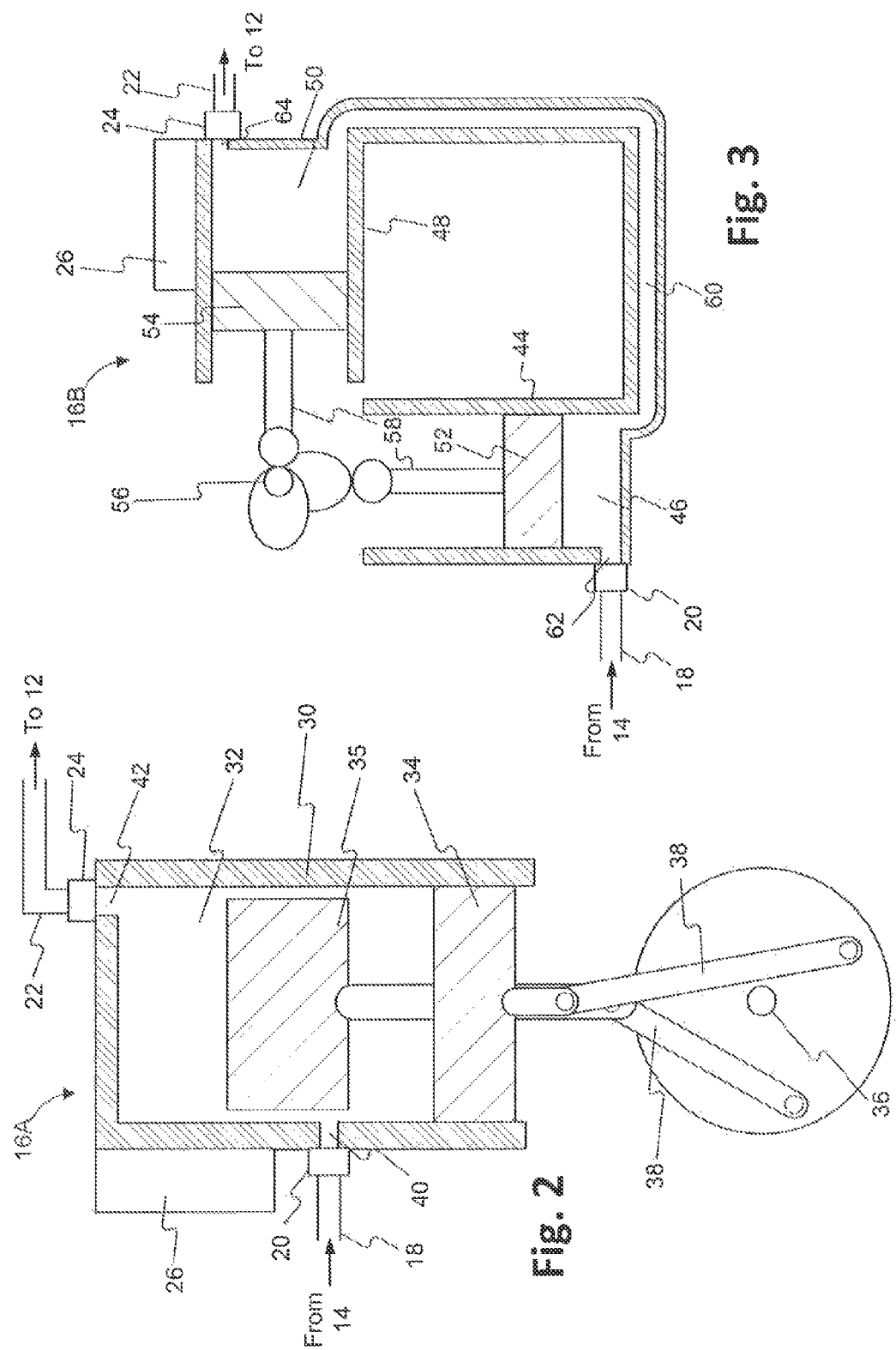

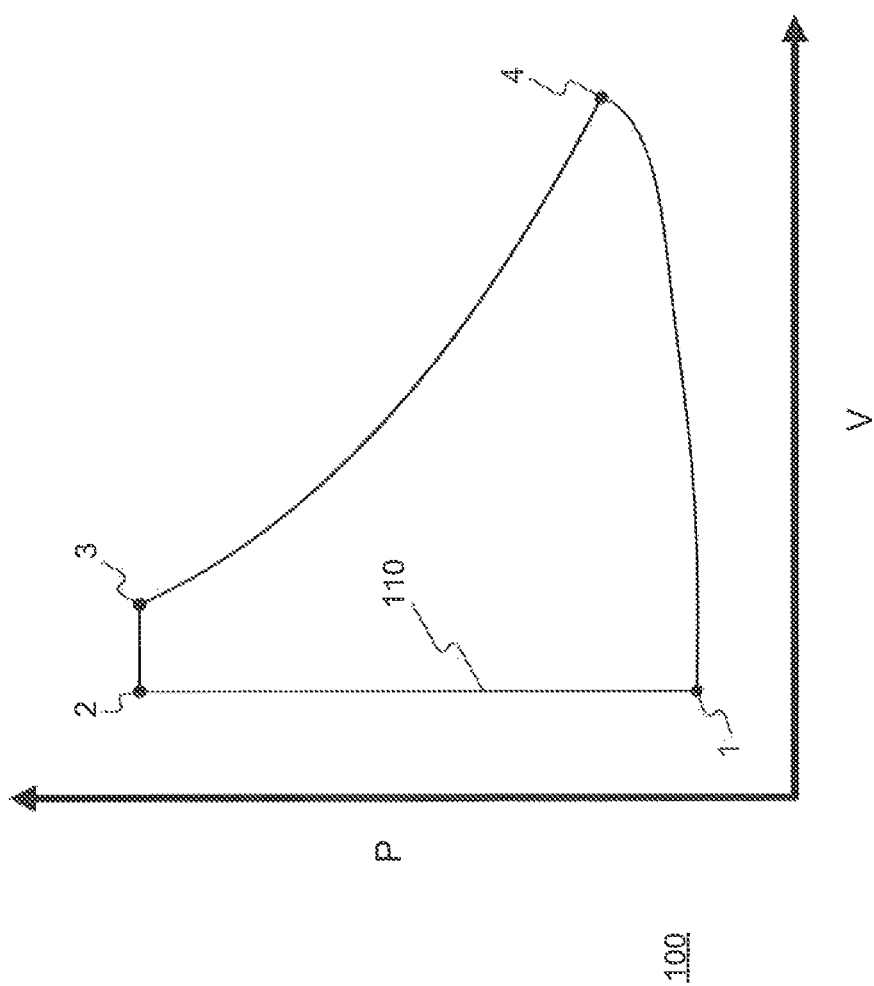

GAS PRODUCTION SYSTEM FOR PRODUCING HIGH PRESSURE GAS

TECHNICAL FIELD

The present disclosure is directed to a gas production system, more particularly, to a gas production system for producing high pressure gas.

BACKGROUND

Due to the rising cost of diesel fuel and ever-increasing restrictions on exhaust emissions, engine manufacturers have developed engines that utilize alternative fuels. One such fuel is natural gas (NG). While many of these engines consume compressed natural gas (CNG), it may be desirable to transport the NG as liquefied natural gas (LNG) and convert the gas to CNG before it is delivered to the engine. In many cases, the converted CNG must be pressurized before injection into the engine. However, current technology for converting LNG to high pressure CNG requires compressors and/or pumps that necessitate additional power to run, producing unacceptable parasitic losses to engine power (in magnitude and/or quality).

An example of a system for converting liquid fuel to gaseous fuel is disclosed in U.S. Patent Application Publication No. 2010/0005812 by Watts et al ("the '812 publication"). The system of the '812 publication includes a vessel that receives liquid hydrogen from a supply container. The vessel is heated by a heat transfer system to vaporize the hydrogen. The gaseous hydrogen is transferred to au accumulator, where the gas is stored for future use.

While the system of the '812 publication may be capable of converting liquid fuel into a gaseous state, it may be less than ideal. For example, a power source may be necessary to pump the liquid hydrogen from the tank, operate valves that regulate flow of hydrogen through the system, and/or accumulate the gaseous hydrogen. Further, the attained pressure of the gaseous hydrogen may be limited by the dimensions of the vessel, which may be insufficient for certain high-pressure gaseous fuel applications. Also, the attained pressure may be further limited because the pressure in the vessel must be low enough to allow additional hydrogen to enter. This is because the supply pressure must overcome the pressure in the vessel in order for additional hydrogen to enter.

The present disclosure is directed to overcoming one or more of the problems set forth above and/or other problems of the prior art.

SUMMARY

In one aspect, the present disclosure is directed to a method for producing high pressure gaseous fuel. The method may include receiving liquefied fuel in a container having an effective volume, reducing the effective volume of the container, and heating the liquefied fuel. The method may also include releasing some gaseous fuel out of the container. The method may further include increasing the effective volume of the container, cooling residual gaseous fuel, and directing liquefied fuel into the container to replace released gaseous fuel. The method may include converting a change in the effective volume of the container to mechanical power.

In another aspect, the present disclosure is directed to a gas production system for producing high pressure gaseous fuel. The gas production system may include a tank configured to store liquefied fuel and a device configured to receive gaseous fuel and produce power and waste heat. The gas production system may also include a conversion pump. The conversion pump may include a container, a liquefied fuel port fluidly connected between the tank and the container, and a gaseous fuel port fluidly connected between the container and the device. The conversion pump may also include a first piston disposed within the container and a second piston disposed within the container and configured to move fluid between different areas of the container. The conversion pump may additionally include a heat transfer device configured to transfer heat to fuel in the container. The conversion pump may further include a crankshaft driven by the first piston to produce auxiliary power.

In yet another aspect, the present disclosure is directed to a gas production system for producing high pressure gaseous fuel. The gas production system may include a tank configured to store liquefied fuel and a device configured to receive gaseous fuel and produce power and waste heat. The gas production system may also include a conversion pump. The conversion pump may include a first cylinder and a second cylinder, a liquefied fuel port fluidly connected between the tank and the first cylinder, a transfer line fluidly connected between the first cylinder and the second cylinder, and a gaseous fuel port fluidly connected between the second cylinder and the device. The conversion pump may also include a first piston disposed within the first cylinder, a second piston disposed within the second cylinder, and a heat transfer device configured to transfer heat to fuel in the second cylinder. The conversion pump may further include a crankshaft driven by the second piston to produce auxiliary power

BRIEF DESCRIPTION OF THE DRAWINGS

FIG. 2 is a schematic illustration of an exemplary fuel pump that may be used in conjunction with the gas production system of FIG. 1, according to a first embodiment;

FIG. 3 is a schematic illustration of an exemplary fuel pump that may be used in conjunction with the gas production system of FIG. 1, according to a second embodiment; and FIG. 4 is a plot of volume vs. pressure corresponding to an exemplary disclosed conversion cycle performed by the gas production system of FIG. 1.

DETAILED DESCRIPTION

Figure 1:
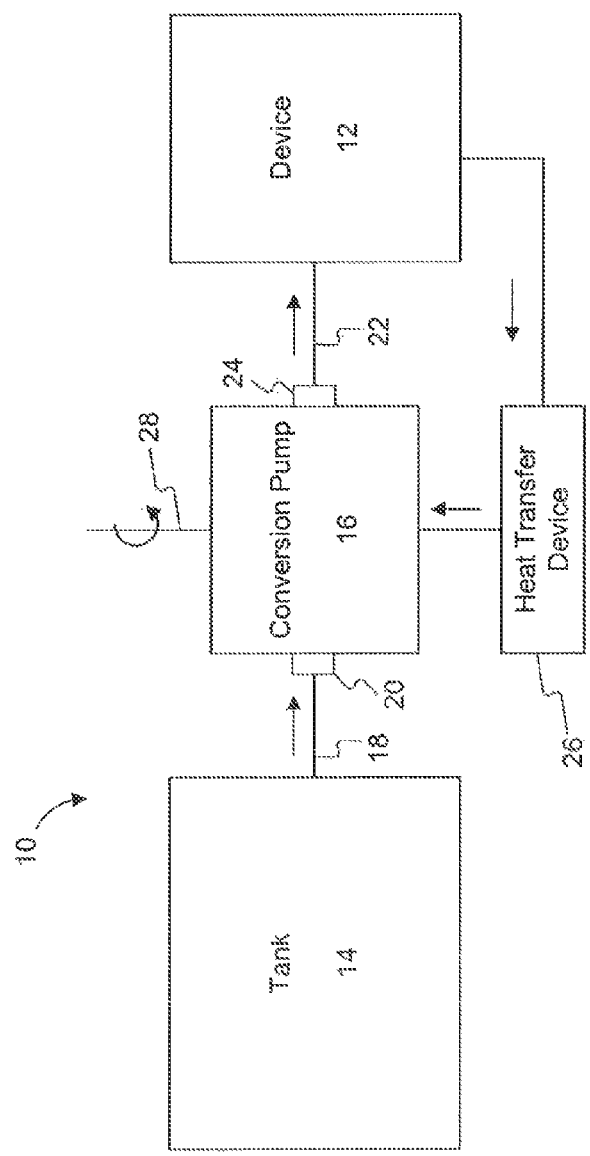
FIG. 1 is a schematic illustration of an exemplary disclosed gas production system.

FIG. 1 depicts an exemplary disclosed gas production system 10 for producing high pressure gas. In an exemplary embodiment, the high pressure gas may be a fuel that is directed to a device 12 for consumption. For example, the high pressure gas may be compressed natural gas (CNG). However, it should be understood that the gas may be any fuel or other fluid, such as methane, hydrogen, air, steam, etc. Device 12 may be any device configured to consume the high pressure fuel produced by gas production system 10, such as a combustion engine, a turbine engine, a furnace, etc. For example, device 12 may be a dual-fuel engine, such as a locomotive engine, configured to run on diesel fuel and compressed natural gas (CNG). In an exemplary embodiment, gas production system 10 may be configured to produce CNG for consumption by device 12.

Gas production system 10 may include a tank H and a conversion pump 16. Tank 14 may be a storage vessel configured to store a liquefied fuel, such as liquefied natural gas (LAG) Conversion pump 16 may be a device configured to convert liquefied fuel (e.g., LNG) to gaseous fuel (e.g., CNG) for eventual consumption by device 12. In at least some embodiments, conversion pump 16 may also be a device that produces power through the process of converting the fuel to a high pressure gas. For example, conversion pump 16 may be a heat engine configured to produce power through pressurization and heating of a fluid, modified to allow some of the pressurized fluid to be released, the remaining pressurized fluid producing said power, and additional low pressure fluid to replace the released fluid.

As shown in FIG. 1, conversion pump 16 may be fluidly connected to tank 14 and device 12 by at least one supply line 18 and at least one output line 22, respectively. In an exemplary embodiment, tank 14 may supply LNG to conversion pump 16 through supply line 18. In addition, CNG produced by conversion pump 16 may be delivered from conversion pump 16 to device 12 through output line 22. In some embodiments, a valve 20 may regulate introduction of LNG from supply line 18 into conversion pump 16 and a valve 24 may regulate release of CNG from conversion pump 16 to output line 22. Valves 20 and 24 may be any type of valve known in the art, such as a check valve, poppet valve, ball valve, thermal expansion valve, etc.

In an exemplary embodiment, conversion pump 16 may be configured to receive LNG and produce CNG through performance of a conversion cycle. The conversion cycle, which will be described in more detail below, may include a step of heating the LNG, such as to boil the LNG to generate CNG. Gas production system 10 may include a heat transfer device 26 configured to transfer heat to conversion pump 16 during the conversion cycle. In an exemplary embodiment, heat transfer device 26 may be configured to transfer heat produced by device 12 to conversion pump 16. For example, as shown in FIG. 1, heat transfer device 26 may be operably connected to device 12 and conversion pump 16 such that heat produced by device 12 may be absorbed by fuel (e.g., LNG) contained within conversion pump 16.

Device 12 may produce heat through consumption of fuel (e.g., CNG) supplied by conversion pump 16. For example, in an embodiment in which device 12 is a combustion engine, device 12 may produce power through combustion of CNG. The combustion process may produce excess heat, which may be absorbed (e.g., through a radiator, cooling jacket, etc.), released (e.g., through exhaust), and/or reused (e.g., through exhaust gas recirculation (FOR)). Other embodiments of device 12 may similarly produce heat (e.g., a furnace burning CNG or other fuel). Heat transfer device 26 may be any device configured to transfer at least some of the heat produced by device 12 to conversion pump 16. For example, heat transfer device 26 may be a heat exchanger with CNG pipes interposed with heated pipes to transfer heat (e.g., via convection and/or conduction). The heated pipes may be heated by fluid that previously absorbed heat from device 12, such as water from a radiator or cooling jacket, or exhaust gas, for example.

In an exemplary embodiment, conversion pump 16 may also be configured to produce power through performance of the conversion cycle. For example, in some embodiments, conversion pump 16 may include components that allow for the production of mechanical power. As shown in FIG. 1, conversion pump 16 may be connected to a crankshaft 28. As the conversion cycle is performed, pressurization of the fuel inside conversion pump 16, for example, may cause rotation of crankshaft 28. Rotation of crankshaft 28 may create auxiliary power that may be used to provide power to another device. For example, crankshaft 28 may power a generator for producing electricity. In another example, crankshaft 28 may power a pump configured to pressurize fuel before delivery to conversion pump 16.

FIG. 2 illustrates an exemplary configuration of conversion pump 16, according to a first embodiment 16A. As shown in FIG. 2, conversion pump 16A may be fluidly connected between tank 14 and device 12 by supply line 18 and output line 22. Valves 20 and 24 may control entrance and exit of fuel from conversion pump 16A, respectively. Heat transfer device 26 may be arranged to transfer heat to at least a portion of conversion pump 16A.

Conversion pump 16A may include a container, which may be configured as a cylinder 30. Cylinder 30 may at least partially define an expansion chamber 32. For example, cylinder 30 may define all but a bottom wall of expansion chamber 32. A first movable member, such as a piston 34, may also define expansion chamber 32. For example, piston 34 may define a bottom wall of expansion chamber 32. A second movable member, such as a displacement piston 35, may be configured to reciprocate within expansion chamber 32 to move fluid between different areas of cylinder 30 (e.g., a hot side and a cold side). In an exemplary embodiment, piston 34 and displacement piston 35 may be connected to a crankshaft 36, such as by linkages 38. It should be understood, however, that other connections that drive each piston through its required stroke may be used. For example, a quick return or dwell linkage mechanism (e.g., Whitworth quick return), a linear motor or electric motor on a rack and pinion, a hydraulic actuator, or another connection mechanism known in the art, may be used in place of crankshaft 36 and/or linkages 38.

Expansion chamber 32 may be fluidly connected to supply line 18 through an inlet port 40. Liquefied fuel (e.g., LNG) may be introduced into expansion chamber 32 through inlet port 40. Valve 20 may operate to control introduction of liquefied fuel into expansion chamber 32 through inlet port 40. Similarly, expansion chamber 32 may be fluidly connected to output line 22 by an outlet port 42, which may allow gaseous fuel (e.g., CNG) to flow from expansion chamber 32 to output line 22. Valve 24 may be operated to control release of gaseous fuel to output line 22 through outlet port 42.

In an exemplary embodiment, conversion pump 16A may be configured to perform a conversion cycle to convert liquefied fuel (e.g., fuel received through inlet port 40) into gaseous fuel (e.g., fuel released through outlet port 42), and simultaneously produce power. As will be described in more detail below, transfer of heat from heat transfer device 26 may function to change the state of at least some of the fuel from liquid to gas, and this state change may produce energy that can be translated into mechanical power (e.g., cause a power stroke of piston 34).

FIG. 3 illustrates another exemplary configuration of conversion pump 16, according to a second embodiment 16B. As with conversion pump 16A, conversion pump 16B may also be fluidly connected to tank 14 and device 12 through supply line 18 and output line 22, respectively. Valves 20, 24 may also be similarly arranged, as shown in FIG. 3. Heat transfer device 26 may be positioned to transfer heat to at least a portion of conversion pump 16B.

Conversion pump 16B may include a container separated into two parts, such as a first cylinder 44 and a second cylinder 48. A first movable member, such as a piston 52, may be arranged for reciprocal movement within first cylinder 44. A second movable member, such as a piston 54, may be similarly arranged for reciprocal movement within second cylinder 48. In an exemplary embodiment, first cylinder 44 and piston 52 may together define a cold chamber 46. Similarly, second cylinder 48 and piston 54 may together define a hot chamber 50. In an exemplary embodiment, heat transfer device 26 may be configured to transfer heat to cylinder 48 and fuel in hot chamber 50.

Pistons 52 and 54 may be operably connected to a crankshaft 56, such as by connectors 58 and corresponding cams, such that rotation of crankshaft 56 results in linear movement of each piston 52, 54 within cylinders 44 and 48, respectively. Conversion pump 16B may be configured such that linear movement of each pistons 52, 54 may cause compression and expansion of cold chamber 46 and hot chamber 50. For example, linear movement of piston 52 may include a compression stroke in which a volume of cold chamber 46 is decreased and an expansion stroke in which the volume is increased. Piston 54 may be similarly arranged with respect to hot chamber 50. While crankshaft 56 and connectors 58 are described herein, it should be understood, that other connections that drive each piston through its required stroke may be used. For example, a quick return or dwell linkage mechanism (e.g., Whitworth quick return), a linear motor or electric motor on a rack and pinion, a hydraulic actuator, or another connection mechanism known in the art, may be used in place of crankshaft 56 and/or connectors 58.

As shown in FIG. 3, cold chamber 46 and hot chamber 50 may be fluidly connected to each other by a transfer line 60. Transfer line 60 may be a connection pipe configured to transfer fluid between cold chamber 46 and hot chamber 50. Cold chamber 46, hot chamber 50, and transfer line 60 may combine to define an effective volume of conversion pump 16B. Transfer line 60 may additionally combine a regenerator to change the temperature of the fluid to approach that of the chamber it is approaching. The effective volume of conversion pump 16B may change as pistons 52 and 54 move within cylinders 44 and 48. In this way, the timing of pistons 52 and 54 (which may be determined by the relative positioning of cylinders 44, 48 and connectors 58) may affect the effective volume of conversion pump 16B over time. In an exemplary embodiment, the timing of pistons 52 and 54 may be offset by about 90°. For example, piston 52 may reach a position with respect to cylinder 44 about 90° after piston 54 reached approximately the same position with respect to cylinder 48.

As has been described, conversion pump 16B may receive fuel from supply line 18 and provide fuel to output line 22. As shown in FIG. 3, an inlet port 62 may be positioned in cylinder 44 to fluidly communicate supply line IS with cold chamber 46. Valve 20 may regulate opening and closing of inlet port 62. Similarly, an outlet port 64 may be positioned in cylinder 48 to fluidly communicate hot chamber 50 with output line 22. Valve 24 may regulate opening and closing of outlet port 64.

In an exemplary embodiment, conversion pump 16B may be configured to perform a conversion cycle to convert liquefied fuel (e.g., fuel received through inlet port 62) into gaseous fuel (e.g., fuel released through outlet port 64), and simultaneously produce power. As will be described in more detail below, movement of pistons 52 and 54 may transport liquid fuel to hot chamber 50. In addition, transfer of heat from heat transfer device 26 may change the state of at least some of the fuel from liquid to gas and the conversion may produce energy that can be translated into mechanical power (e.g., cause a power stroke of piston 54).

INDUSTRIAL APPLICABILITY

The exemplary disclosed gas production system may be applied to any system that utilizes a high pressure gas. The disclosed gas production system may be particularly applicable to a system that includes a device that consumes high pressure gaseous fuel (e.g., CNG), exemplary disclosed conversion pump may be used to produce the high pressure gas by converting it from a liquefied form. In this way, a fuel may be stored and/or transported as a liquid (e.g., LNG) and converted to a gaseous foci prior to delivery to a device for consumption.

In one example, the exemplary disclosed gas production system may be utilized on a train to provide fuel to a locomotive. In particular, the gas production system may provide CNG to one or more dual fuel combustion engines on one or more locomotives. LNG may be stored and transported in a tank on the train as fuel. One or more conversion pumps may be positioned on the train and configured to receive LNG from the tank. Each conversion pump may convert received LNG into CNG that is suitable for consumption by an associated engine. The CNG may be introduced into a fuel delivery system (e.g., an accumulator, high pressure rail, fuel injector system, etc.) that injects the CNG into a combustion chamber of the engine at an appropriate time.

In order to convert the liquefied fuel into gaseous fuel, operation of the conversion pump may include repeated performance of a conversion cycle. The conversion cycle may include heating the fuel to phase change the fuel to a gaseous state at which significant energy in the form of pressure may be released. This energy may allow the conversion pump to produce auxiliary mechanical power. As has been described, a heat transfer device may be used to transfer heat from the device that consumes the gaseous fuel to the conversion pump (e.g., from the exhaust of the locomotive engine). In this way, heat produced by the engine may be used as energy for powering the conversion pump and producing additional fuel suitable for consumption by the device.

Heat produced by the engine may be used to generate the auxiliary power, which may be used to power a generator, for example. In this way, excess heat produced by the engine may be used for other purposes, instead of being wasted. In addition, the capacity of an associated coolant device (e.g., a radiator) may be reduced, as the conversion pump will absorb some of the engine's waste heat.

FIG. 4 is an exemplary plot 100 of pressure vs. volume that may illustrate the conditions of a conversion pump 16, such as conversion pump 16A and/or 16B, during operation, including an exemplary conversion cycle 110. It should be understood, however, that conversion cycle 110 may represent an example of an idealized conversion cycle, with variations in pressure and volume due to various operating conditions (e.g., inefficiencies such as friction, incomplete heat transfer, phase change, etc.) within the scope of the present disclosure. In addition, it should be understood that the conditions may be different during startup of conversion pump 16.

As used herein, volume may refer to the effective volume of conversion pump 16 when it is closed off from receiving or releasing fuel. For example, the volume of conversion pump 16A may be the volume of expansion chamber 32, and the volume of conversion pump 16B may be the combined volume of cold chamber 46, hot chamber 50, and transfer line 60. In each of conversion pump 16A and 16B, the effective volume is time dependent on the position of the associated piston(s), such as pistons 34, 52 and 54. Similarly, pressure may refer to the overall pressure of the fluid in the effective volume of the conversion pump 16A, 16B.

As shown in FIG. 4, conversion cycle 110 may include stages 1, 2, 3, and 4, which occur in sequential order, but which have been so numbered as an example, as any of the stages may be considered the first stage. In general, conversion cycle 110 may be similar to the cycle of a heat engine, such as the Stirling cycle. However, as shown in FIG. 4, the pressure near stages 2 and 4 may be different than that of a corresponding Stirling cycle, since fluid may be allowed to exit the system at or near stage 2, thereby causing a pressure decrease compared to the Stirling cycle (where no fluid would exit the system and the pressure would be allowed to increase), and fluid may be allowed to enter the system at or near stage 4, thereby causing a pressure increase compared to the Stirling cycle (where no fluid would enter the system and the pressure would be allowed to continue to decrease). Further, the pressure increase may be more than offset by the phase change from gas to liquid, which occurs between stave 4 and stage 1, which may cause the pressure to be less than that of a corresponding Stirling cycle.

As shown in FIG. 4, prior to reaching stage 1, conversion cycle 110 may be at a state of conversion pump 16 at which volume is at a maximum and pressure is relatively low. In this state, the fuel in conversion pump 16 may be mostly gaseous, with valve 20 open to allow liquefied fuel to flow into conversion pump 16. As conversion cycle 110 approaches stage 1, volume is reduced, which may cause mixing of gaseous and liquefied fuel within conversion pump 16. Therefore, stage 1 may include a mixture of liquefied fuel and gaseous fuel inside conversion pump 16, with volume and pressure at or near a minimum.

After reaching minimum volume at stage 1, conversion cycle 110 may continue to pressurize the fuel at constant (or near-constant) volume. Pressurization may occur by heating the fuel (i.e., isochoric heat addition), which may include transferring heat from an engine to the fuel. As the fuel is heated, most or all of the remaining liquefied fuel may phase change to a gaseous state. In other words, the fuel boils. Boiling of the fuel causes the density of the fuel to decrease and the pressure to increase.

When the pressure reaches a first threshold value (depicted as stage 2 in FIG. 4), valve 24 may open and allow gaseous fuel to be released into output line 22. Therefore, at stage 2, pressure may be at a maximum (which may also be the threshold pressure), with volume at a minimum. As stage 2 transitions to stage 3, the release of mass may cause a pressure drop in conversion pump 16. However, since the temperature of the gaseous fuel in the conversion pump 16 may continue to increase, the pressure drop may be offset and the pressure of the fuel in the conversion pump 16 may remain at or near the threshold value for a period of time while fuel is released (i.e., isobaric mass rejection).

At some point after reaching stage 2, the volume of conversion pump 16 begins to expand. However, heat transfer and pressurization may continue, which may maintain the pressure at or near the first threshold pressure. As the volume continues to expand, valve 24 may close when the pressure drops below a second threshold pressure, which may be approximately equal to the first threshold pressure. This state may be stage 3. During an exemplary conversion cycle 110, approximately 20% of the mass of the fuel may be released as gaseous fuel to output line 22.

Conversion cycle may begin a transition from stage 3 to stage 4 when the pressure begins to decrease from the first and/or second threshold pressure while the volume is expanding. In an exemplary embodiment, the high pressure fuel may cause the expansion. For example, the residual gaseous fuel (e.g., high pressure fuel that was not released to output line 22) may exert a force on a movable member, such as a piston, thereby increasing a corresponding volume of conversion pump 16. The force of the pressurized fuel may be translated as power to another device, such as through crankshaft 28. In this way, a change in effective volume may be converted to mechanical power.

Pressure may continue to decrease as the volume of conversion pump 16 expands and conversion cycle 110 approaches stage 4. At stage 4, volume may again be at or near its maximum. The decrease in pressure may have caused some cooling of fuel into its liquefied form once again. The temperature also drops as at least some of the fuel is moved away from an area heated by heat transfer device 26, further contributing to the decrease in pressure.

As conversion cycle 110 transitions back to stage 1, conversion pump 16 may experience constant (or near-constant) volume expansion of the remaining fuel, followed by compression back to minimum volume. The constant (or near-constant) volume expansion may be caused by cooling of the residual gaseous fuel. As mentioned above, at least some of the cooling may be due to at least some of the fuel being moved to a location that is not heated by heat transfer device 26. In addition, at some point between stages 4 and 1, such as when the pressure decreases to a threshold value, valve 20 may open to allow liquefied fuel to enter. The liquefied fuel may cause rapid cooling of the residual gaseous fuel in conversion pump 16 (e.g., the fuel remaining in conversion pump 16 from the previous cycle). The amount of liquefied fuel allowed to enter conversion pump 16 may be approximately equal to the amount of fuel released to output line 22.

As the additional fuel enters and the pressure continues to decrease, most or all of the fuel is in or transitions to a liquefied state. After the volume is decreased to its minimum, conversion cycle 110 again reaches stage 1. Conversion cycle 110 may thereafter be continuously repeated to produce high pressure gaseous fuel and mechanical power.

In one example of conversion cycle 110, a conversion pump 16 that generates approximately 750 kg/hr of CNG (e.g., natural gas at approximately 10,000 PSI) may cycle at about 1 Hz, with an effective volume oscillating between a minimum of about 2 L and a maximum of about 50 L. Approximately 1140 KW of heat may be transferred to the fuel in conversion pump 16 to boil the fuel between stages 1 and 2. Approximately 0.24 kg of CNG may be released to output line 22 between stages 2 and 3. As conversion cycle 110 transitions to stage 4, approximately 250 KW of power may be absorbed (e.g., translated as mechanical power via crankshaft 28). As conversion cycle 110 returns to stage 1, approximately 1250 KW of heat is removed (e.g., by introducing approximately 0.24 kg LNG to replace the released CNG) and about 25 KW of work is done (in addition to external pumping work to inject the LNG, which introduces about 120 KW of latent heat). It should be understood that a conversion pump 16 configured to operate according to these conditions is merely exemplary and other Examples of conversion cycle 110, as applied to exemplary conversion pumps 16A and 16B, will now be described.

In the example of conversion pump 16A, prior to reaching stage 1, piston 34 may be at its lowest point, displacement piston 35 may be in the process of moving fluid away from a hot side of expansion chamber 32 (e.g., away from heat transfer device 26), and liquefied fuel may enter expansion chamber 32 through inlet port 40. As conversion cycle approaches stage 1, piston 34 moves through a compression stroke, reducing the volume of expansion chamber 32, which reaches a minimum when piston 34 reaches its highest point. At this point, displacement piston 35 may be moving through a stroke that displaces the fuel to a hot side of cylinder 30. As conversion cycle 110 transitions to stage 2, displacement piston 35 may finish its stroke, moving most or all of the fuel in expansion chamber 32 to a hot side of cylinder 30. As a result, the fuel may be boiled by the heat transferred from heat transfer device 26.

When stage 2 is reached, pressure may be at a threshold pressure, and valve 24 may open to allow gaseous fuel to be released through outlet port 42 to output line 22. Release of gaseous fuel may continue oven after piston 34 begins an expansion stroke and volume begins to increase. Stage 3 may be reached at or near the point that pressure begins to decrease below a second threshold pressure.

The remaining pressurized gaseous fuel may force piston 34 to move or continue to move through an expansion stroke, corresponding to conversion cycle 110 between stages 3 and 4. The expansion stroke may cause an increase in volume of expansion chamber 32, lowering the pressure and temperature of the fuel. In addition, the expansion stroke may be translated as mechanical power to a crankshaft (e.g., crankshaft 28). As the volume of expansion chamber 32 expands, and displacement piston 35 transfer the fuel back to the cold side of cylinder 30, cooling and a decrease in pressure may occur. The cooling and pressure decrease may continue as conversion cycle 110 moves between stages 4 and 1. At some point (e.g., when the pressure decreases to a threshold pressure), valve 20 may be opened and liquefied fuel may be allowed to enter expansion chamber 32. The liquefied fuel may cause rapid decreases in temperature and pressure, converting most or all of the leftover fuel back into a liquid. Piston 34 may move through its compression stroke until stage 1 is reached, and the cycle may be repeated.

In the example of conversion pump 16B, prior to stage 1 piston 52 may be at its lowest point while piston 54 may be approximately halfway through a compression stroke. Liquefied fuel may enter cold chamber 46 through inlet port 62. As conversion cycle 110 transitions to stage 1, piston 52 may move from its lowest point through half of a compression stroke while piston 54 may move finish its compression stroke and reach its highest point. Since both of pistons 52 and 54 move simultaneously through their compression stroke as transition to stage 1 occurs, the effective volume of conversion pump 16B is reduced. Conversion cycle 110 may reach stage 1 when piston 52 has moved through approximately half of its compression stroke and piston 54 reaches its highest point at the end of its compression stroke.

Between stages 1 and 2, piston 52 may finish its compression stroke, while piston 54 may move through a first half of its expansion stroke. These movements may correspond to a constant (or near-constant) effective volume of conversion pump 16, since pistons 52, 54 are moving in opposite directions at the same rate. However, even though volume is constant, the fuel may be pressurized. This may be the result of the compression of the fuel in cold chamber 46 causing most or all of the fuel to be moved to hot chamber 50 via transfer line 60, where it may be boiled by heat transfer device 26. When a threshold pressure is reached, valve 24 may be opened and fuel may be released to output line 22 through outlet port 64. As conversion cycle transitions to stave 3, release of fuel may continue until the pressure falls below the threshold pressure, at which point valve 24 may be closed.

At some point after reaching stage 2, the pressurized fuel may cause piston 52 to start and piston 54 to finish their respective expansion strokes. The resulting force may be translated as mechanical power through crankshaft 28. Expansion may continue between stages 3 and 4. Conversion cycle 110 may reach stage 4 when piston 52 has moved through a first half of its expansion stroke and piston 54 is at its lowest position, having completed its expansion stroke. Expansion of the effective volume of conversion pump 16 causes the pressure to decrease, as well as the temperature to drop. At some point (e.g., when pressure decreases to a threshold value), valve 20 may be opened and liquefied fuel may be allowed to enter cold chamber 46. The liquefied fuel may cause rapid decreases in temperature and pressure, converting most or all of the leftover fuel back into a liquid.

Conversion cycle 110 may transition away from stage 4 as piston 52 finishes its expansion stroke and piston 54 moves through a first half of its compression stroke. Even though this corresponds to a constant (or near-constant) effective volume, the pressure of the fuel may rapidly decrease due to the movement of most of the fuel hack to cold chamber 46 and corresponding phase change. The decrease in temperature, especially that caused by the addition of liquefied fuel, causes a dramatic drop in pressure. As conversion cycle 110 transitions back to stage, 1, the volume may be reduced back to a minimum, mixing the gaseous and liquefied fuel. Eventually pistons 52 and 54 reach their respective stage 1 positions, allowing conversion cycle 110 to restart. Conversion pump 16B may continue to operate by performing repeated conversion cycles 110 to produce high pressure gaseous fuel and mechanical power.

The exemplary disclosed conversion pumps allow liquefied fuel to be converted into a high pressure gaseous fuel, which may be delivered to a device for consumption. The device may produce heat, which may be directed back to the conversion pump and used to perform corresponding conversion cycle to produce additional gaseous fuel. In this way, efficient transport, storage, and use of fuel may be accomplished. In addition, surplus power (e.g., mechanical power) may be generated by a conversion pump performing an exemplary disclosed conversion cycle, which may be an improvement over other devices that may be capable of generating high pressure gaseous fuel, as these devices draw power from a corresponding device, resulting in parasitic losses, inefficient use of fuel, and wasted energy.

It will be apparent to those skilled in the art that various modifications and variations can be made to the gas production system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A gas production system for producing high pressure gaseous fuel, comprising:
   a tank configured to store liquefied fuel;
   a device configured to receive gaseous fuel and produce power and waste heat; and
   a conversion pump having:
      a container;
      a liquefied fuel port fluidly connected between the tank and the container;

a gaseous fuel port fluidly connected between the container and the device;

a first piston disposed within the container and defining a bottom wall of the container;

a second piston disposed within the container between the first piston and a top wall of the container, the second piston being configured to move fluid between different areas of the container;

a heat transfer device configured to transfer heat from the device to fuel in the container; and a crankshaft driven by the first piston to produce auxiliary power, wherein the gas production system is configured to transport the liquefied fuel from the tank and through the liquefied fuel port to the container, convert the liquefied fuel to gaseous fuel within the container, and transport the gaseous fuel from the container and through the gaseous fuel port to the device, wherein the conversion of the liquefied fuel to gaseous fuel is configured to cause movement of the first piston to increase an effective volume of the container.

2. The gas production system of claim 1, wherein the heat transfer device is configured to transfer waste heat from the device to boil liquefied fuel in the container.

3. The gas production system of claim 1, wherein the first piston changes an effective volume of the container during performance of the conversion cycle.

4. The gas production system of claim 1, wherein an effective volume of the container is configured to oscillate between 2 L and 50 L.

5. The gas production system of claim 1, wherein the device is an engine for a locomotive.

6. The gas production system of claim 5, wherein the heat from the device is from the exhaust of the engine.

7. The gas production system of claim 1, wherein the gas production system is configured to allow liquefied fuel to enter the container and gaseous fuel to exit the container.

8. The gas production system of claim 1, wherein the conversion pump cycles at 1 Hz.

* * * * *